July 9, 1963
W. STELZER
3,097,018
MOTOR VEHICLE HYDRAULIC BRAKE SYSTEM
Filed June 12, 1961
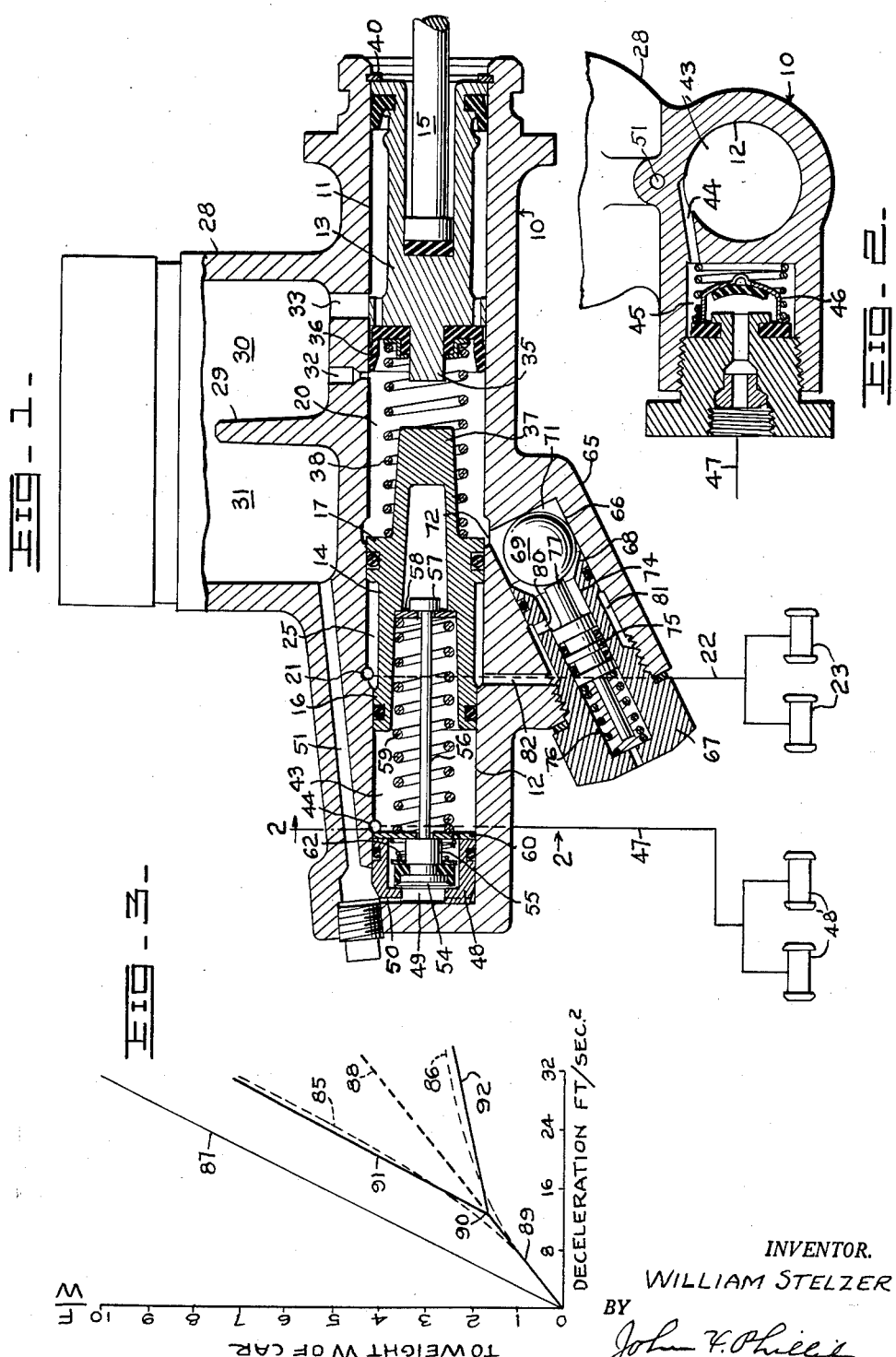
INVENTOR.
WILLIAM STELZER
BY
John F. Phillips
ATTORNEY

United States Patent Office 3,097,018
Patented July 9, 1963

3,097,018
MOTOR VEHICLE HYDRAULIC BRAKE SYSTEM
William Stelzer, Bloomfield Hills, Mich., assignor to Kelsey-Hayes Company, Detroit, Mich., a corporation of Delaware
Filed June 12, 1961, Ser. No. 116,394
15 Claims. (Cl. 303—6)

This invention relates to a motor vehicle hydraulic brake system and has particular reference to a master cylinder embodying therewith automatic means for compensating for the shifting of the vehicle weight under decelerating conditions.

An important object of the invention is to provide a novel master cylinder which has separate pressure chambers connected to the front and rear wheel cylinders and which operate automatically to provide a stepless change in hydraulic pressure transmitted to the wheel cylinders after a certain rate of vehicle deceleration is reached, a lower pressure being transmitted to the rear wheel cylinders and higher pressure to the front wheel cylinders without additional pedal pressure, thus providing effective braking and minimizing the locking and sliding of the rear vehicle wheels.

A further object is to effect a gradual change in pressure taking place immediately after a predetermined rate of vehicle deceleration is reached to follow more closely the ideal distribution of braking forces between the front and rear wheels as the vehicle decelerates.

A further object is to provide a highly simplified, compact construction by combining the weight transfer compensating means with the elements of the divided or tandem master cylinder.

A further object is to provide a tandem master cylinder of the type referred to having two pressure chambers connected respectively to the front and rear wheel cylinders each of which chambers is provided with a pressure generating plunger controlled by the vehicle brake pedal or by a booster motor, and to provide means automatically operative when a predetermined rate of vehicle deceleration is reached to substantially reduce the effective area of the plunger which generates pressure for the rear wheel cylinders to reduce such pressure, and whereby a given force applied by the brake pedal or booster motor at such time becomes automatically more effective for transmitting force to the plunger which generates front wheel cylinder pressures whereby, during the application of predetermined plunger-operating forces, relatively lower pressures will be supplied for operating the rear wheel brakes and relatively higher pressures for operating the front wheel brakes, thus compensating for the shifting of the vehicle weight during deceleration.

A further object is to provide such a mechanism which operates in a conventional manner to supply hydraulic fluid at the same pressure to the front and rear wheel cylinders to apply the brakes and which mechanism is operative after the predetermined deceleration rate is reached to transmit a limited reduced amount of the fluid to the rear wheel cylinders in a fixed proportion to the fluid transmitted to the front wheel cylinders to thereby relatively rapidly increase the hydraulic pressure in the latter and to relatively slowly increase pressure in the rear wheel cylinders.

Other objects and advantages of the invention will become apparent during the course of the following description.

In the drawing I have shown one embodiment of the invention. In this showing:

FIG. 1 is an axial sectional view through the master cylinder, parts being shown in elevation and the wheel cylinders being diagrammatically indicated.

FIG. 2 is a section on line 2—2 of FIG. 1.

FIG. 3 is a graph illustrating the distribution of braking pressures under different conditions.

Referring to FIG. 1, the numeral 10 designates a master cylinder casting having two bores 11 and 12, the latter of which is of slightly smaller diameter than the bore 11. Two plungers 13 and 14 are axially movable in the master cylinder. The plunger 13 is slidable in the bore 11 and is operable by a push rod 15 connected to the vehicle brake pedal (not shown) although it will become apparent that this rod may be operated by a booster motor. The plunger 14 has a smaller end 16 slidable in the bore 12 and is provided intermediate its ends with an enlargement 17 slidable in the bore 11.

The two plungers form therebetween a pressure chamber 20 from which fluid is displaced in a manner to be described through a port 21 through hydraulic lines 22 to the rear vehicle wheel cylinders 23. The space between the plunger portions 16 and 17 forms a chamber 25 directly communicating with the passage 21.

The casting 10 includes a reservoir 28 divided by a partition 29 to form chambers 30 and 31 the former of which supplies replenishing fluid through conventional ports 32 and 33 communicating respectively with the chamber 20 and with the space back of the left hand end of the plunger 13.

The plunger 13 is provided with an axial extension 35 surrounded by a conventional lipped seal 36. In the event of a failure in pressure in the chamber 20, the extension 35 is engageable with an axial extension 37 formed on the plunger 14.

A return spring 38 is arranged in the chamber 20 and biases the plungers 13 and 14 away each other and movement of the plunger 13 to the right to its normal "off" position is limited by a snap ring 40.

The plunger 14 forms with the left hand end of the master cylinder a pressure chamber 43 communicating with a passage 44 (FIG. 2) leading into a chamber 45 in which is arranged a conventional residual valve 46 which provides for the passage of hydraulic fluid therepast in the usual manner to a line 47 which supplies fluid to the front wheel brake cylinders 48'. It will be understood that the fluid is supplied from the passage 21 to the line 22 through a similar residual valve.

In the left hand end of the bore 12 is arranged a valve cage 48 having opening 49 communicating as at 50 with a passage 51 leading to the reservoir chamber 31 to supply replenishing fluid to the chamber 43 as described below.

A normally slightly open valve 54 is arranged in the cage 48 and is carried by a head 55 to one end of which is connected a rod 56. The other end of this rod carries a head 57 engageable with a plate 58. A return spring 59, stronger than the spring 38, engages at one end with the plate 58 and at its other end with a plate 60 arranged against the adjacent end of the cage 48. A light biasing spring 62 urges the valve 54 into engagement with the seat surrounding the opening 49. Obviously when the parts are in the normal positions shown, the spring 59 biases the plunger 14 to the right, overcoming the light spring 62 and maintaining the valve 54 off its seat. Such movement of the valve 54 is limited by engagement of the head 55 with the plate 60, and such engagement limits movement to the right of the head 57, thus stopping the plunger 14 in its normal position shown in FIG. 1. The plate 60 may be apertured to provide for leakage of replenishing fluid into the chamber 43 whenever the valve 54 is unseated.

The casting 10 has an integral angular extension 65 provided therein with a bore 66 in which is arranged a headed plug 67 provided at its inner end with a conical surface 68 for a purpose to be described. Between the plug 67 and the inner end of the bore 66 is arranged a ball valve 69, movable under the influence of inertia when the vehicle decelerates to move upwardly along the inclined bottom portion of the conical surface 68. The ball is arranged in a chamber 71 communicating through a port 72 with the chamber 20.

The plug 67 is provided with a bore 74 in which is arranged a plunger 75 biased upwardly and to the right by a spring 76. The plunger 75 is provided with an axial projection 77 normally engaging the ball 69 to maintain it in its normal position in contact with the end wall of the chamber 71. The end of the bore 74 adjacent to the ball 69 communicates with the chamber 71 and also communicates through a port 80 with an annular space 81 formed around the plug 67. This space, in turn, communicates with a passage 82 leading to the chamber 25.

In FIG. 3 there is shown a graphic representation of hydraulic brake pressure occurring under different conditions. In this graph the ratio of the retarding force of the brakes to the weight of the car is plotted against the rate of deceleration of the vehicle. For the sake of simplicity the static weight distribution of the vehicle is assumed to be equal for the front and rear so that the hydraulic pressure is also representative of the retarding force when the coefficient of friction is assumed to be constant. The dotted curve 85 represents the ideal retarding force or hydraulic pressure at the front wheels while the dotted curve 86 represents the ideal retarding force or hydraulic pressure at the rear wheels in relation to deceleration and vehicle weight transfer resulting from deceleration. As is well known, the inertia affecting the body of the vehicle tends to shift the weight thereof forwardly when the vehicle is decelerated thus making it desirable ideally to increase the braking action at the forward end of the vehicle and to decrease the braking force at the rear wheels, thus minimizing the chance of locking and skidding the rear wheels.

In FIG. 3 the line 87 represents the total retarding force of the vehicle while the dotted line 88 represents the retarding force or hydraulic pressure at each of the front and rear wheel cylinders when no vehicle weight transfer compensating means are used. The solid line 89 represents the increase in front and rear wheel cylinder hydraulic pressures up to the point 90 where the ball valve 69 closes as described below. From the point where the ball valve closes, front wheel hydraulic pressures are represented by the line 91 while rear wheel pressures are represented by line 92. It will be noted that the lines 91 and 92 closely approach the ideal distribution of pressures as represented by the dotted lines 85 and 86.

*Operation*

As previously stated, the rod 15 may be operated either by the brake pedal or by a booster motor. When this rod is operated it moves the plunger 13 to the left to displace fluid from the chamber 20 to the rear wheel cylinders through the port 72, chamber 71, and bore 74, port 80, space 81, passage 82, chamber 25 and thence through passage 21 and the residual valve associated therewith, and through lines 22 to the rear wheel cylinders 23. Some fluid also may be displaced through passage 21 from the chamber 25.

Upon compression of the spring 38, the plunger 14 starts to move to the left, such movement being imparted by pressure generated in the chamber 20. Upon initial movement of the plunger 14 the head 57 will be released whereupon the spring 62 seats the valve 54 to close communication between the chamber 43 and the various passages leading to the reservoir chamber 31. Pressure will then be generated in the chamber 43 and fluid will be displaced through passage 44 (FIG. 2) thence past the residual valve 46 and through line 47 to the front wheel cylinders 48.

The brakes thus will be operated and vehicle deceleration will be effected. The pressure build-up in the chamber 71 will be identical with that in the chamber 20. When such pressure reaches a predetermined point, the plunger 75 will be moved against the spring 76, thus releasing the projection 77 from the ball 69. When the rate of vehicle deceleration reaches a predetermined point, the ball 69 rolls up the inclined bottom of the conical surface 68. Such surface then acts as a seat for the ball 69 and closes communication between the chamber 71 and the various ports and passages leading to the chamber 25. Thereafter, no fluid can be displaced from the chamber 20 to the rear wheel cylinders and the plungers 13 and 14 now act in unison. While the plunger 13 no longer displaces fluid into the rear wheel cylinders, the movement of the plunger 14 not only displaces fluid to the front wheel cylinders but also displaces fluid from the chamber 25 to the rear wheel cylinders. This displacement is due to the difference in the areas of the portions 16 and 17 of the plunger 14 operating in the bores 11 and 12 respectively. Therefore, in this second stage of braking operation, fluid at a greatly reduced rate will be supplied to the rear wheel cylinders and this rate of displacement will be in fixed ratio to the rate of the displacement of fluid from the chamber 43 to the front wheel cylinders.

Since the volume of fluid transmitted to the rear wheel cylinders is only a small fraction of the volume transmitted to the front wheel cylinders, the pressure in the latter increases at a higher rate than the pressure in the rear wheel cylinders. In other words, the pressure increase from the start of the braking operation occurs as graphically represented by the line 89 in FIG. 3 and the ball 69 closes at the point 90. From this point on the retarding force or braking action at the front wheels increases quite rapidly as indicated by the line 91, while the pressure increase in the rear wheel cylinders increases at a much lower rate as indicated by the line 92.

In this connection it will be noted that up to the point 90 (FIG. 3) where the ball valve 69 closes, pedal or booster motor forces are divided in the generation of pressures in the chambers 20 and 43. This division of pressure generating forces changes greatly beyond the point where the valve 69 closes, smaller pedal forces being required to generate pressure in the chamber 25. Thus, greater pedal forces will be utilized for generating pressures in the chamber 43 for applying the front wheel brakes. The result of the operation of the construction, therefore, is to utilize simple means operable in accordance with vehicle deceleration for reducing the rate of pressure increases at the rear wheels while increasing the rate of pressures at the front wheels. This provides for conditions closely approaching the ideal for utilizing substantially greater front wheel brake operating pressures while reducing rear wheel pressures and greatly minimizing any chance that the rear wheels will lock and slide. It will be apparent that the results are accomplished in a highly efficient way without sacrificing the total braking forces to which the vehicle is subjected.

In the retractile movement when the brake pedal is released, the plunger 13 moves to the right while pressures return to what they were when the ball valve 69 closed. Further retractile movement of the brake pedal, with the plunger 14 also moved to the right, renders the spring 76 effective for returning the ball valve 69 to its normal position.

The spring 38 will return the plunger 13 to its normal position. The spring 59 is stronger than the spring 38, as stated above, and the spring 59 returns the plunger 14 to its normal position, which position is reached when the plate 58 engages the head 57 and the head 55 also engages the plate 60. Movement of the plunger 14 is arrested at such point and the valve 54 will be opened for the replenishment of fluid in the chamber 43. The plunger 13, having reached normal position, will uncover the port 32 to replenish fluid in the chamber 20 and also in the chamber 25 through the various ports and passages connecting such chamber to the chamber 20.

In the event of a failure in pressure in the chamber 20, for example, if the line 22 should break, the extension 35 will move into engagement with the extension 37 whereupon the plunger 13 directly operates the plunger 14 to displace fluid from the chamber 43 to operate the front wheel brakes. If a pressure failure should occur in the chamber 43, pressure in the chamber 20 will move the plunger 14 to the left to its limit of movement, whereupon additional movement of the plunger 13 will generate pressure in the chamber 20 to apply the rear wheel brakes. Thus a break in either line 22 or 47 will not result in a total loss in braking effort and the vehicle may be brought to a stop.

If the brakes of one vehicle axle should fade, while the others do not, the tendency is that the brakes without the fade receive more pressure and are induced to do more work. While this is no help in the prevention of wheel skidding, it at least evens out the load.

From the foregoing it will be apparent that the present mechanism provides a relatively simple, compact, unitary master cylinder construction which operates automatically to generate equal pressures in the front and rear wheel cylinders up to the point where vehicle deceleration reaches a predetermined rate. Beyond this point, the device operates automatically to greatly reduce the rate of pressure increase to the rear wheels and to greatly increase the rate of pressure increase to the front wheels. This operation automatically compensates for the weight transfer of the vehicle body occurring above such predetermined rate of vehicle deceleration.

It is to be understood that the form of the invention herewith shown and described is to be taken as a preferred example of the same, and that various changes in the size, shape and arrangement of parts may be made as do not depart from the spirit of the invention or the scope of the appended claims.

I claim:

1. A hydraulic braking system for a motor vehicle having front and rear wheel cylinders, comprising a master cylinder having fluid displacing means operative for displacing fluid separately to the front and rear wheel cylinders, including pressure control means, and a single device connected to the master cylinder and responsive to the rate of vehicle deceleration for so controlling the development of pressure in said master cylinder as to increase the rate of increase of pressure to the front wheel cylinders and to decrease the rate of pressure increase to the rear wheel cylinders.

2. A hydraulic braking system for a motor vehicle having front and rear wheel cylinders, comprising a master cylinder having a plurality of pressure chambers and a plurality of plungers operable for developing pressures in said chambers and including pressure control means, separate fluid lines connecting said chambers to the front and rear wheel cylinders, and a single device responsive to the rate of vehicle deceleration for controlling the pressures developed in said chambers for accelerating the rate of pressure increase in fluid supplied to the front wheel cylinders and for decreasing the volumetric rate of fluid supplied to the rear wheel cylinders whereby pressures in the rear wheel cylinders increase at a rate lower than the rate of pressure increase in the front wheel cylinders.

3. A hydraulic brake system for a motor vehicle comprising a master cylinder, a first fluid displacing means in said master cylinder to actuate the front wheel cylinders, a second fluid displacing means in said master cylinder to actuate the rear wheel cylinders, said first fluid displacing means having auxiliary fluid displacing means of limited fluid displacing capacity compared with said first and second fluid displacing means, said auxiliary fluid displacing means being connected to the rear wheel cylinders, and vehicle deceleration responsive means for rendering said second fluid displacing means inoperative for actuating the rear wheel cylinders whereby said first fluid displacing means actuates the front wheel cylinders and said auxiliary displacing means displaces fluid in a limited volume to the rear wheel cylinders compared with the volume of fluid displaced by said first fluid displacing means to the front wheel cylinders.

4. A hydraulic brake system for a motor vehicle comprising a master cylinder, a first fluid displacing means in said master cylinder to actuate the front wheel cylinders, a second fluid displacing means in said master cylinder to actuate the rear wheel cylinders, said first fluid displacing means having auxiliary fluid displacing means of limited fluid displacing capacity compared with said first and second fluid displacing means, said auxiliary fluid displacing means being connected to the rear wheel cylinders, vehicle deceleration responsive means comprising a valve arranged between said second fluid displacing means and the rear wheel cylinders and having a fixed seat engageable by said valve when the rate of vehicle deceleration reaches a predetermined point to close communication between said second fluid displacing means and the rear wheel cylinders to render said second fluid displacing means wholly inoperative for applying the rear wheel brakes whereby said first fluid displacing means displaces fluid to operate the front wheel brakes and said auxiliary fluid displacing means displaces fluid in relatively small volume to the rear wheel cylinders as compared with the displacement of fluid from said first fluid displacing means to the front wheel cylinders.

5. In a hydraulic brake system for a motor vehicle having a plurality of wheel cylinders, a master cylinder having a pair of plungers therein defining therebetween a first pressure chamber communicating with certain of said wheel cylinders, the end of one of said plungers opposite said pressure chamber forming with the adjacent end of said master cylinder a second pressure chamber communicating with the other wheel cylinders, means for supplying force to the other plunger to displace fluid from said first chamber into said certain wheel cylinders and to transmit movement to said one plunger to displace fluid from said second pressure chamber to the other wheel cylinders, means responsive to a predetermined rate of vehicle deceleration for rendering said other plunger inoperative for supplying pressure to said certain wheel cylinders from said first pressure chamber, said master cylinder having a third pressure chamber of limited capacity compared with said first and second pressure chambers and connected to said certain wheel cylinders, said one plunger having a portion movable into said third chamber to displace from such chamber to said certain wheel cylinders fluid at a volumetric rate substantially lower than the volumetric rate of displacement of fluid from said second pressure chamber to said other wheel cylinders whereby, after operation of said vehicle deceleration responsive means pressure in said certain wheel cylinders will increase at a lower rate than pressure in said other wheel cylinders.

6. A hydraulic braking system for a motor vehicle having front and rear wheel cylinders, comprising a master cylinder having two coaxial bores of different diameters opening into each other, a pair of plungers in said master cylinder defining therebetween a first chamber, one of said plungers having a smaller end slidable in the smaller bore and a larger portion spaced therefrom slidable in the larger bore and forming with said smaller plunger portion and with said master cylinder an auxiliary chamber of limited capacity communicating with the rear wheel cylinders, said smaller end of said one plunger forming with the adjacent end of said master cylinder a second chamber communicating with the front wheel cylinders, a duct normally establishing communication between said first chamber and said auxiliary chamber, means for applying a force to the other plunger to displace fluid into said auxiliary chamber and to operate said one plunger to displace fluid from said second chamber to the front wheel cylinders and to displace fluid from said auxiliary chamber into the rear wheel cylinders, and means responsive to a predetermined rate of vehicle deceleration for closing said duct.

7. A brake system according to claim 6 wherein said duct is provided with a valve seat, said means for closing said duct comprising a valve responsive to vehicle deceleration at a predetermined rate for engaging said seat.

8. A brake system according to claim 6 provided with a plug projecting into said duct and provided at one end with a valve seat, said means for closing said duct comprising a ball arranged in said duct between said seat and said first chamber, said ball being subject to inertia when said predetermined rate of vehicle deceleration is reached to engage said seat.

9. A brake system according to claim 6 provided with a plug projecting into said duct and provided at one end with a valve seat, said means for closing said duct comprising a ball arranged in said duct between said seat and said first chamber, said ball being subject to inertia when said predetermined rate of vehicle deceleration is reached to engage said seat, and means for preventing said ball from engaging said seat until pressure in said first chamber has increased to a predetermined point.

10. A brake system according to claim 6 provided with a plug projecting into said duct and provided at one end with a valve seat, said means for closing said duct comprising a ball arranged in said duct between said seat and said first chamber, said ball being subject to inertia when said predetermined rate of vehicle deceleration is reached to engage said seat, a plunger slidable in said plug and having one end subject to pressure in said first chamber and having a portion at such end normally engaging said ball, and means biasing said last-named plunger towards said ball to maintain it disengaged from said seat until pressure in said first chamber acting on said end of said last named plunger reaches a predetermined point.

11. A hydraulic braking system for a motor vehicle having front and rear wheel cylinders, comprising a master cylinder having a plurality of plungers therein forming with said master cylinder three pressure chambers one of which is an auxiliary chamber of limited capacity compared with the remaining pair of chambers and is connected to the rear wheel cylinders, one chamber of said pair normally communicating with said auxiliary chamber, the other chamber of said pair communicating with the front wheel cylinders, means for operating said plungers to displace fluid from said chambers, and means responsive to vehicle deceleration for closing communication between said one chamber of said pair and said auxiliary chamber whereby fluid will be displaced to the rear wheel cylinders solely from said auxiliary chamber so that pressure increases in the rear wheel cylinders will occur more slowly than pressures in the front wheel cylinders.

12. A braking system according to claim 11 provided with a duct establishing said normal communication between said first chamber of said pair and said auxiliary chamber, said means for closing communication between the last two mentioned chambers comprising a valve device in said duct movable to closed position when the rate of vehicle deceleration reaches said predetermined point, whereby fluid is displaced to the rear wheel cylinders solely from said auxiliary chamber through its connection with the rear wheel cylinders.

13. A brake system according to claim 11 provided with a duct establishing said normal communication between said first chamber of said pair and said auxiliary chamber, a plug in said duct having a valve seat, said means for closing communication between said first chamber of said pair and said auxiliary chamber comprising an inertia-controlled valve between said seat and said first chamber of said pair and engageable with said seat to close communication through said duct when the rate of vehicle deceleration reaches a predetermined point, whereby fluid is displaced to the rear wheel cylinders solely from said auxiliary chamber through its connection with the rear wheel cylinders.

14. A brake system according to claim 13 wherein said seat is conical and has a lower portion sloping upwardly from the horizontal away from said auxiliary chamber, said valve being a ball movable upwardly along said bottom portion of said valve seat by inertia.

15. A brake system according to claim 13 wherein said seat is conical and has a lower portion sloping upwardly from the horizontal away from said auxiliary chamber, said valve being a ball movable upwardly along said bottom portion of said valve seat by inertia, and means in said plug normally engaging said ball and maintaining it off said seat and subject to pressure in said first chamber of said pair to release said ball for movement toward said seat only after pressure in said first chamber of said pair has increased to a predetermined point.

References Cited in the file of this patent
UNITED STATES PATENTS

| | | |
|---|---|---|
| 2,242,297 | Freeman | May 20, 1941 |
| 2,267,389 | Wolf | Dec. 23, 1941 |
| 2,807,337 | Starling | Sept. 24, 1957 |
| 2,835,271 | Oberthur | May 20, 1958 |